United States Patent [19]
Weeks

[11] Patent Number: 5,207,395
[45] Date of Patent: May 4, 1993

[54] TETHER BAND AND INTERCONNECTOR FOR VIDEOTAPE CARTRIDGE ADAPTOR

[75] Inventor: Jerrold K. Weeks, Hudson, Wis.

[73] Assignee: Minnesota Mining and Manufacturing Company, St. Paul, Minn.

[21] Appl. No.: 690,638

[22] Filed: Apr. 24, 1991

[51] Int. Cl.5 .................. G11B 15/67; G11B 25/06; B65H 23/30

[52] U.S. Cl. .................. 242/199; 360/132; 242/195

[58] Field of Search .................. 242/199, 195; 360/132

[56] References Cited

U.S. PATENT DOCUMENTS

| | | | |
|---|---|---|---|
| Re. 29,976 | 4/1979 | Schoettle et al. | 242/199 |
| 3,105,645 | 10/1963 | Rost | 242/55.13 |
| 3,150,840 | 9/1964 | Briskin et al. | 242/55.13 |
| 3,197,150 | 7/1965 | Camras | 242/55.13 |
| 3,682,415 | 8/1972 | Ibuchi | 242/197 |
| 3,934,840 | 1/1976 | Inaga | 242/195 |
| 4,432,508 | 2/1984 | Inoue et al. | 242/195 |
| 4,452,406 | 6/1984 | Richard | 242/195 |
| 4,477,851 | 10/1984 | Dalziel et al. | 242/195 |
| 4,555,077 | 11/1985 | Platter et al. | 242/198 |
| 4,572,460 | 2/1986 | Hertrich | 242/195 |
| 4,787,570 | 11/1988 | Nakagome | 242/195 |
| 4,793,569 | 12/1988 | Ohsaki | 242/195 |
| 4,826,101 | 5/1989 | Smith | 242/195 |
| 4,828,201 | 5/1989 | Smith | 242/195 |
| 4,832,284 | 5/1989 | Inoue | 242/195 |
| 4,920,436 | 4/1990 | Novak | 242/199 |
| 4,922,353 | 5/1990 | Inoue | 242/198 |
| 5,082,196 | 1/1992 | Turgeon | 242/195 |

FOREIGN PATENT DOCUMENTS 2162150A 1/1986 United Kingdom.
2217684A 1/1989 United Kingdom.

Primary Examiner—Daniel P. Stodola
Assistant Examiner—John Q. Nguyen
Attorney, Agent, or Firm—Merchant, Gould, Smith, Edell, Welter & Schmidt

[57] ABSTRACT

An adaptor for converting a video cartridge to a videocassette format. The adaptor includes a tether band which is used to draw tape from the cartridge and guide the tape across the tape path to a take-up reel inside the adaptor. The tether band is a self supporting cantilever structure eliminating the need for a positive locking clasp connection between the tape and the tether. A single axis non clasping interconnector for use with the band is shown with complimentary alignment zones.

5 Claims, 7 Drawing Sheets

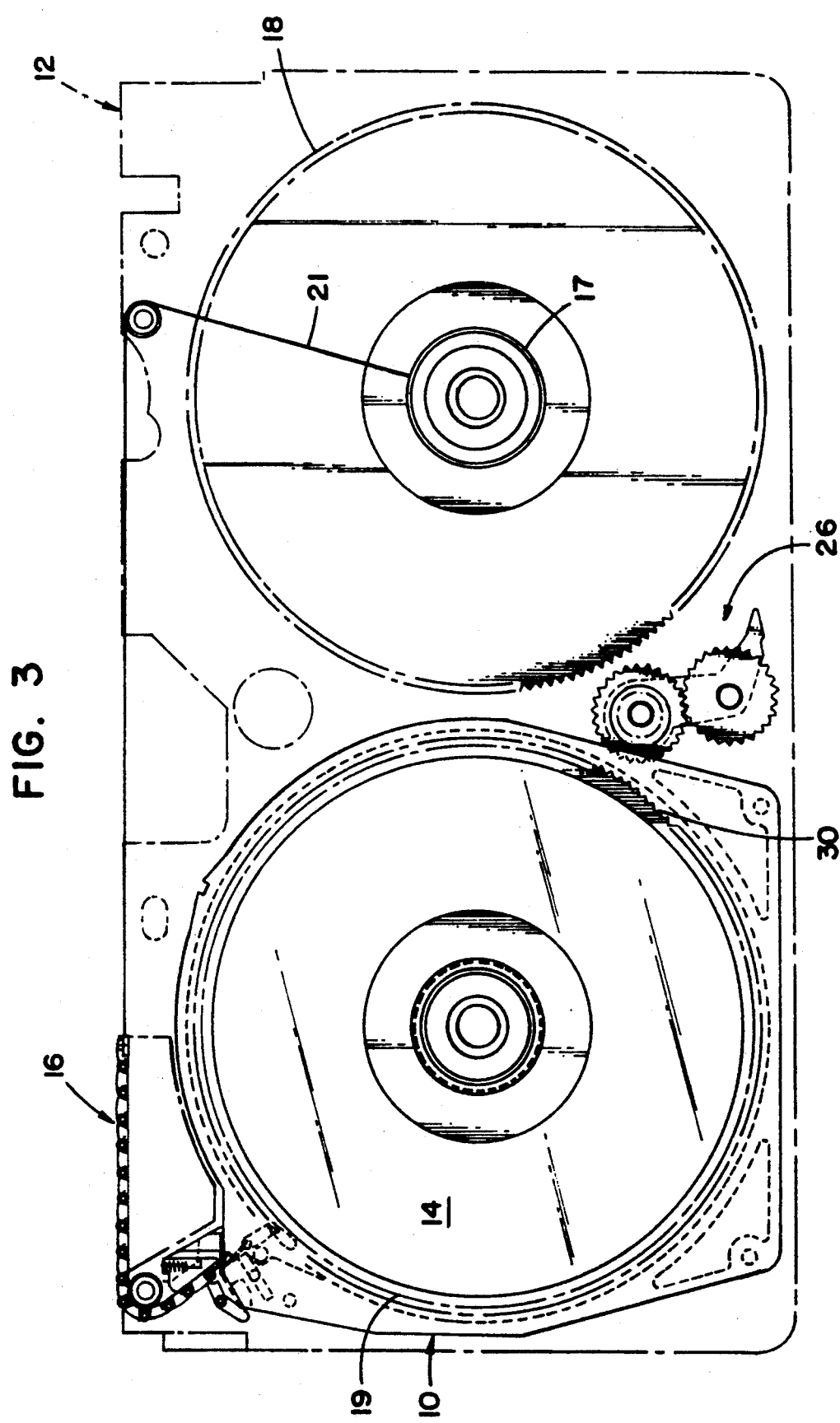

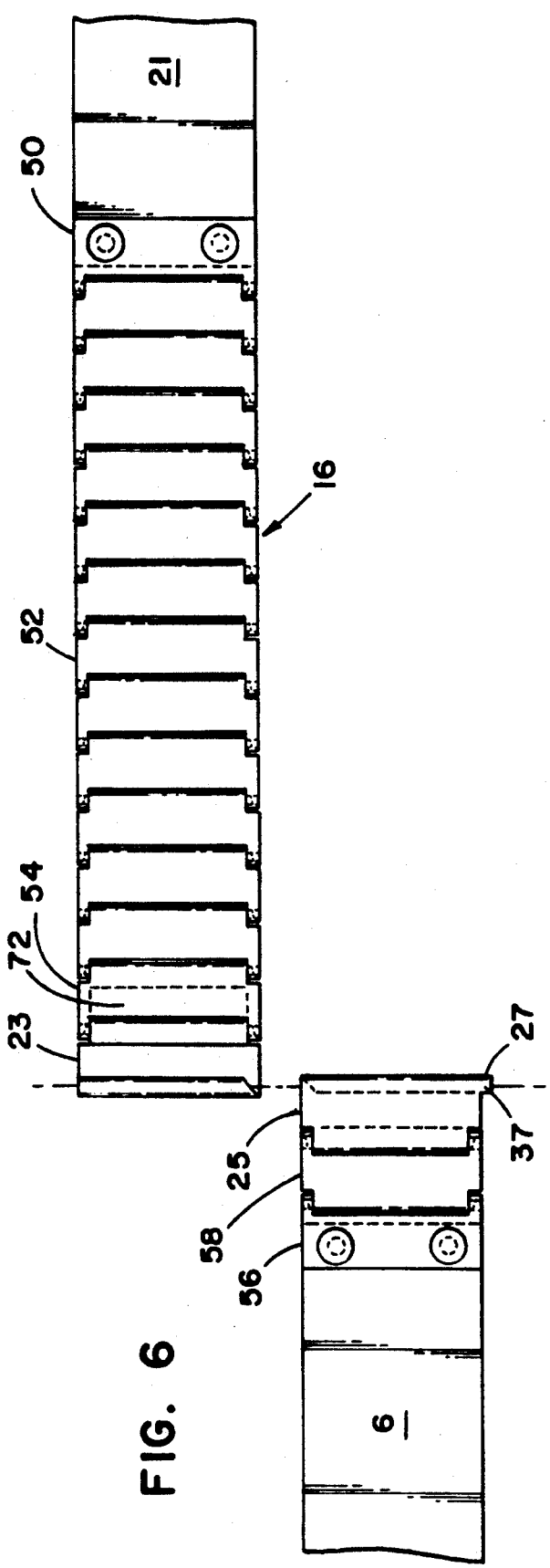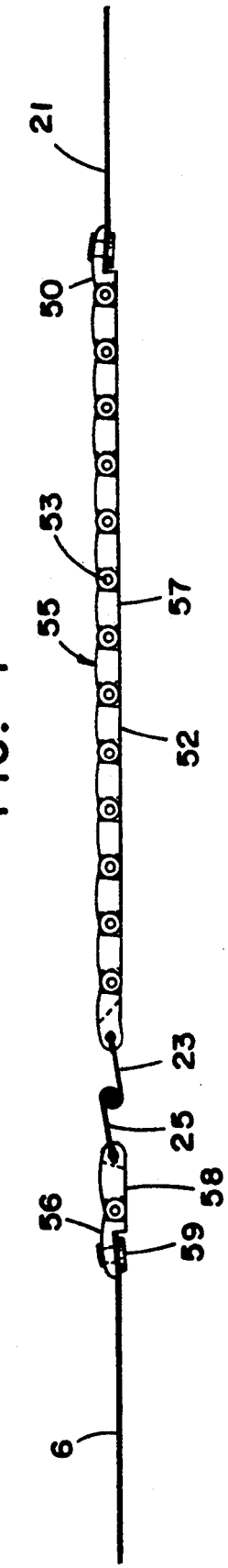
FIG. 6
FIG. 7

TETHER BAND AND INTERCONNECTOR FOR VIDEOTAPE CARTRIDGE ADAPTOR

BACKGROUND OF THE INVENTION

1. Field of the Invention

The present invention relates to a two-piece video cassette which consists of a videotape cartridge for use with a videocassette adaptor. In operation, the tape cartridge is inserted into the cassette adaptor. The insertion of the cartridge into the adaptor connects the tape to a tether assembly, located in the adaptor. Next, the user, activates mechanical winding mechanisms in the adaptor, to advance the tether assembly, and the attached tape, from the supply reel to the take-up reel. In this way, the tape is advanced toward, and loaded onto the take-up reel. After these events, the adaptor has been properly configured, and the two-piece videocassette may be used in conventional videotape equipment designed to accept industry standard videocassettes.

More particularly, the invention is directed to: a self supporting cantilever tether band structure for use in the adaptor; and a single axis, zero insertion force, interconnector.

In use, the tether band forms the winding surface for the tape, stored on the take up reel.

2. Description of the Prior Art

It has become common to use magnetic recording media supplied in a cassette format. The traditional cassette format includes a supply reel and a take up reel. The tape is supplied on the supply reel. One end of this tape is permanently attached to this supply reel and the other end of the tape is permanently attached to the take up reel. In the cassette, the supply reel and the take up reel share the same housing, and in use the tape is transported between the two reels. This packaging strategy is inefficient for tape storage due to the inclusion of an empty reel in the package. In applications such as video cameras the adoption of the cassette format has reduced the amount of tape available for use and has required the development of specialized cassette to cassette adaptors.

For example, adaptors which convert one cassette format to another cassette format are widely known and used as evidenced by U.S. Pat. No. 4,544,970 to H. Ogata, which teaches an adaptor or carrier which converts a miniature format video tape cassette to the standard VHS format. This type of apparatus is used to provide VHS playback capabilities for consumer video tape cameras.

It has been proposed to supply magnetic recording media in a more compact and space efficient cartridge format. In the cartridge format, the housing contains a single supply reel for storing tape. The "free" end of the tape must be threaded or other wise attached to a remote take up reel.

Tape cartridges of various types have been in common use for storing magnetic media as evidenced by U.S. Pat. No. 4,826,101 to J. A. Smith, which teaches a single reel supply cartridge for storing magnetic tape. This type of cartridge is used in the computer industry.

Single reel cartridge coupled with an adaptor for converting a cartridge format to a cassette format are also known as evidenced by U.K. Patent Application No. 2,217,684 A to R. L. Davis as inventor.

Another example of such cartridge to cassette adaptors is known from U.S. Pat. No. 4,920,436 to Novak. Novak teaches, inter alia, a carrier or adaptor which is used to adapt a videotape cartridge to an industry standard videocassette format.

Structures present in Novak include a take-up reel and a tether coupled to the hub of the take-up reel. The tether is guided across the front of the carrier, defining a tape path. In operation, the user inserts the cartridge into the carrier, automatically coupling the tape connector to the tether connector. In Novak, the connection between the tape connector and the tether connector is accomplished by a resilient clasp which makes a positive connection between the tape and the tether. In Novak the tether assembly is very flexible and is not self-supporting.

SUMMARY OF THE INVENTION

Like the prior art, the tether assembly of the present invention, is used to guide the tape onto the take-up reel.

However, in contrast to the prior art structures, the present invention teaches the use of a self supporting tether band assembly which eliminates the need for a clasp or other positive locking connector between the tape and the tether.

The invention also teaches the use of a single axis interconnector which has beveled entry zones which facilitate mating between the tether borne tether connector and the cartridge borne tape connector.

The invention also teaches the use of a tether band structure which forms the winding surface upon the take-up reel hub, for storing tape.

The front of the adaptor has a channel which defines the tape path and the tape path plane. The tether band lies in this tape channel and is trapped by the passage way formed between the walls of the channel and the rear surface of the tape access door.

The tether assembly includes, a tether connector attached to an articulated tether band, which is, in turn attached to a clear plastic leader, or tether. The leader itself is attached to the hub of the take-up reel.

The articulated tether band consists of hinged links which are interconnected such that the band can flex in one plane but cannot flex in the orthogonal plane. These links are hinged and may pivot in the tape plane, while the hinge structures of the band prevent the band from flexing in the orthogonal plane. Thus, in operation the hinged link structures form a self supporting cantilever band that prevents the interconnection between the tape connector and the tether connector from separating during the winding process as the interconnection is transported along unsupported sections of the tape path.

The self supporting band permits the use of non-clasping connectors exemplified by the single axis interconnector shown at the end of the tether band. These interconnector structures are substantially identical, scroll form tubes which can intersect along their axis generating a substantially uni-axial interconnection. The interconnection process can be performed without deforming the elements so that an essentially zero force coupling is achieved. This is highly desirable as it reduces wear on the tape connector, and tether connector.

In operation, these connectors are supported in the coupled position by the band. Mating between the connectors is facilitated by beveled alignment zones which align the connectors with each other. In use, the tether band guides and supports the interconnection as it is moved along the tape path onto the take up reel. The articulated band has a length substantially equal to the circumference of the hub of the take up reel. The winding process causes the band to wrap onto the hub over the tether or leader forming a winding surface to accept the tape.

BRIEF DESCRIPTION OF THE DRAWINGS

Throughout the figures, identical reference numerals refer to identical structural elements, wherein:

FIG. 3 is a schematic plan view of the cartridge, inserted into the adaptor forming a cartridge/adaptor combination, which depicts the tether assembly in the "home" position;

FIG. 6 is a side view of the tether assembly;

FIG. 7 is a elevation of the tether assembly;

DESCRIPTION OF THE PREFERRED EMBODIMENT

Overview of Operation

Figure 1:
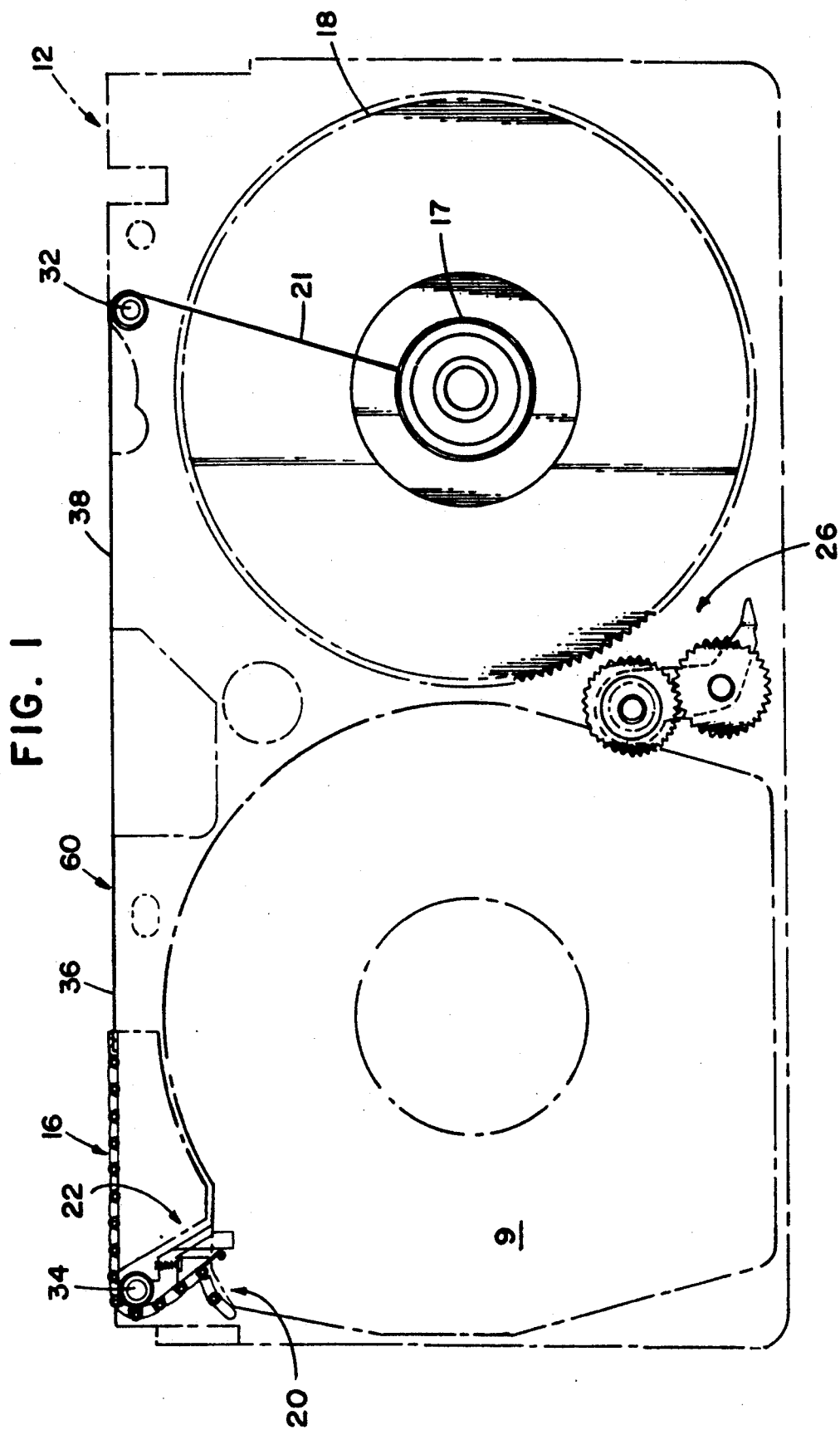
FIG. 1 is a schematic plan view depicting the adaptor, without the companion cartridge.
Figure 2:
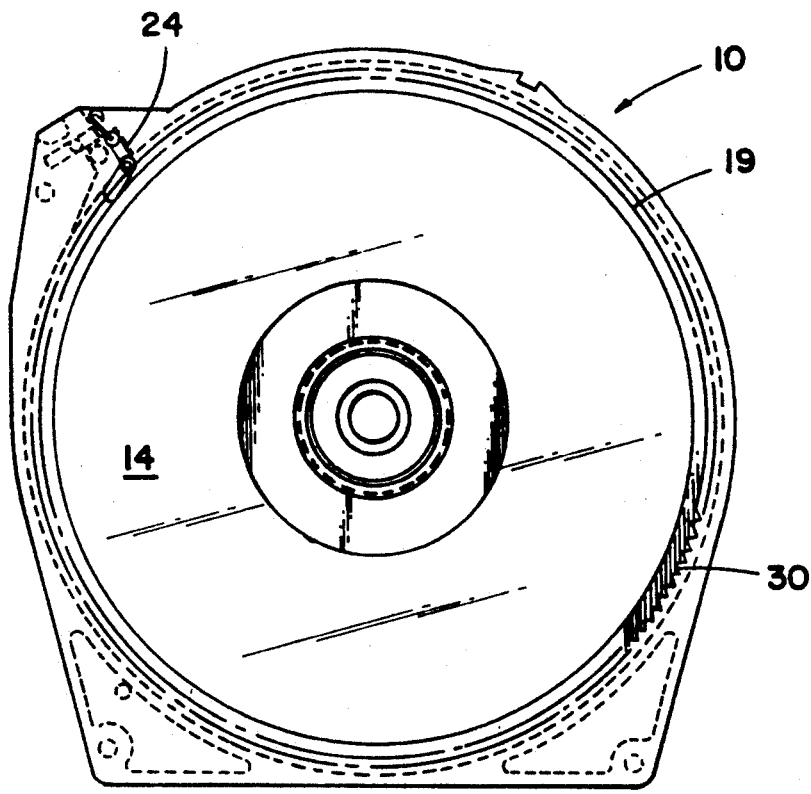
FIG. 2 is a schematic plan view of the cartridge, without the companion adaptor.
Figure 4:
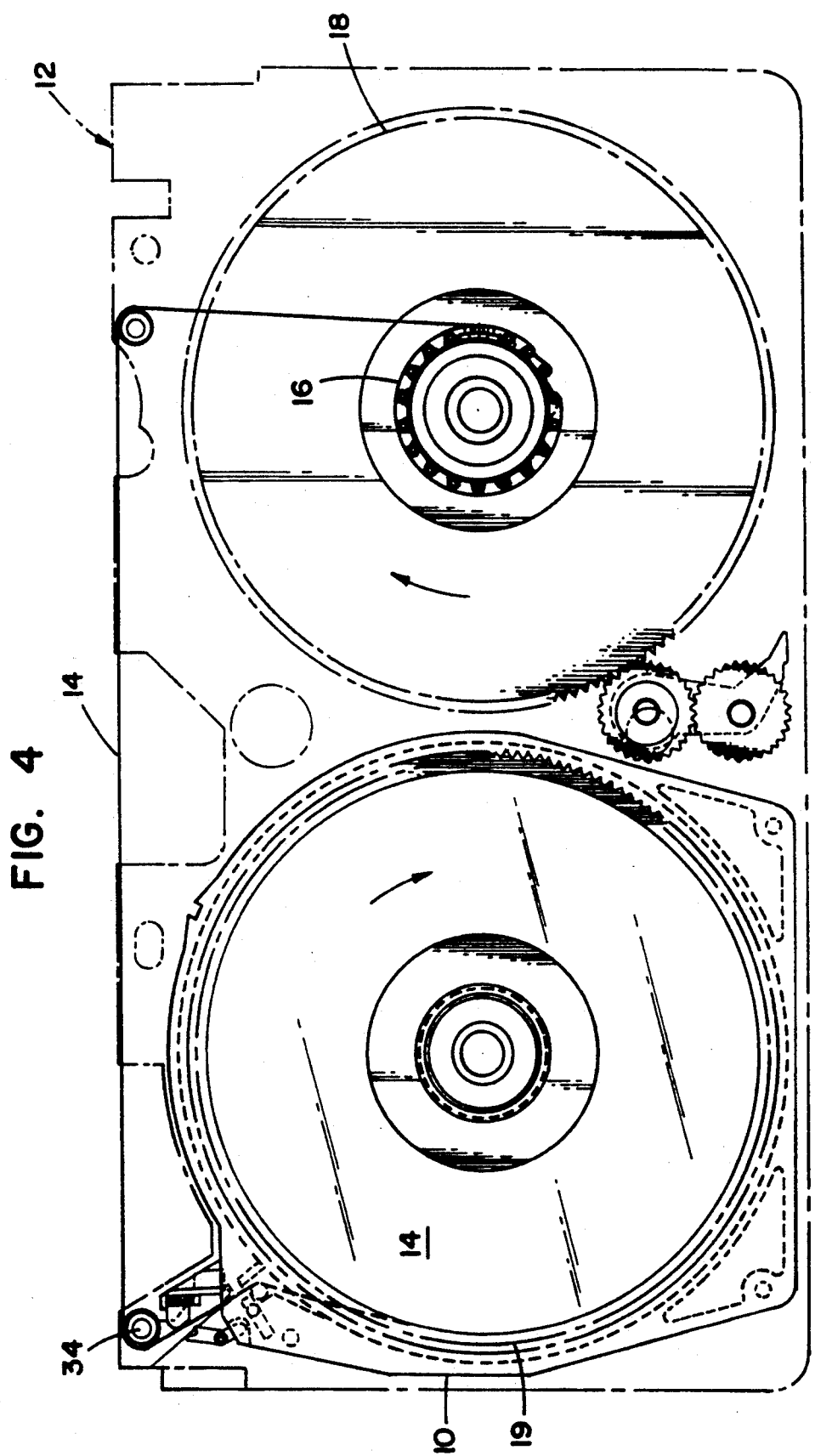
FIG. 4 is a schematic plan view of the cartridge/adaptor combination depicting the tether assembly in the "ready-run" position.
Figure 5:
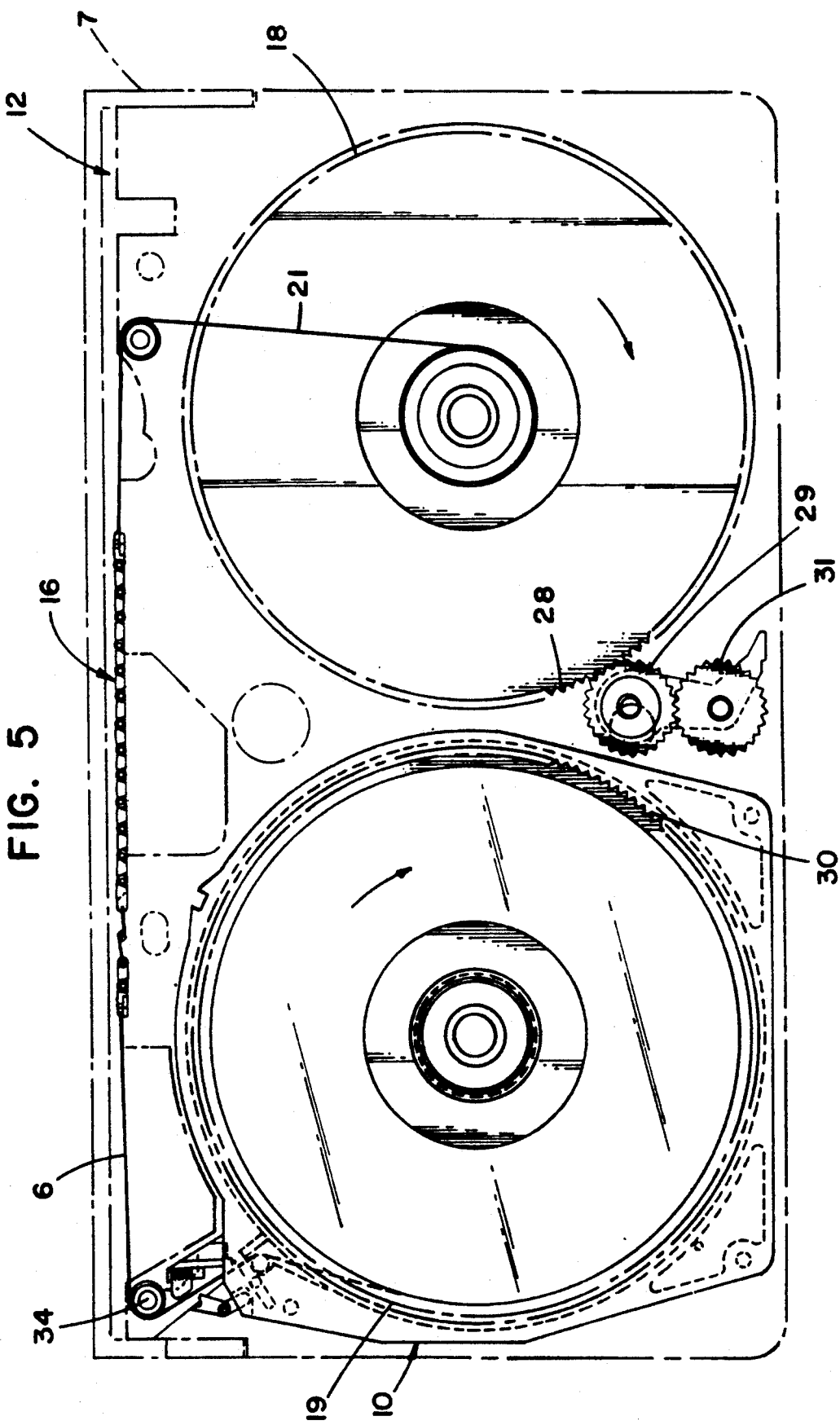
FIG. 5 is a schematic plan view of the cartridge/adaptor combination depicting the tether assembly along the path at a position intermediate between the "home" and "ready-run" positions.

In general, and with reference to FIG. 1 and FIG. 2, the user inserts the cartridge 10 into the carrier 12, forming a composite two-piece structure. The composite structure is shown in FIGS. 3-5. This composite structure mimics the operation of a standard T-120 VHS video cassette when used in commonly available video tape machines.

The process of inserting the cartridge 10 into the cartridge cavity 9 of the adaptor 12 automatically connects the tape 14 in the cartridge with a tether assembly, which is located in the adaptor and which is generally designated 16. This tether assembly 16 is used to pull the tape from the cartridge; guide it across the tape path; and ultimately, to load it upon the take-up reel 18.

In FIG. 3, the cartridge 10, is shown completely seated within the cartridge cavity 9 in adaptor 12. Once the cartridge is in the adaptor 12, the user may use an integral winder mechanism to advance the tether assembly 16 from the "home" position near the cartridge cavity, to a "ready-run" position, where the tape has been lead out of the cartridge and the interconnection hardware is loaded on to the take-up reel 18. The winder mechanism drives the clapper gear assembly 26, which may selectively engage either the take-up reel or the supply reel.

In the "home" position the tether assembly 16 is positioned for mating engagement with a cooperating tape connector 25, carried in the cartridge. The tether assembly 16 is depicted in the "home" position in both FIG 1 and FIG. 3.

In the "ready-run" position, the tether assembly 16 is wound onto the take-up reel 18 forming a winding surface for storing tape. In FIG. 4 the tether assembly 16 is shown in the "ready-run" position.

In FIG. 5 the tether assembly 16 is shown in an intermediate position, midway along the tape path between the "home" position and the "ready-run" position.

When the adaptor has placed the tape in the "ready-run" position the adaptor and cartridge are ready for use. However while the tether connector is in the "home" position or any intermediate position depicted in FIG. 5, attempts to use the adaptor could result in damage to the videotape machine.

Several interlock structures and functions are directed toward preventing improper use of the adaptor. A number of these structures facilitate the trouble-free use of the cartridge with the adaptor.

Returning to FIG. 1, there is shown a cartridge lock assembly which cooperates with the cartridge to ensure that the cartridge may not be accidentally removed from the adaptor while the tape is outside of the cartridge. This structure resides in the adaptor and is generally designated 20.

A tether connector keeper assembly is also provided in the adaptor to retain and locate the tether assembly 16 at the pre-determined "home" location adjacent the cartridge cavity 9. This structure defines the "home" position and is used to facilitate connection between the tape and tether. The tether connector keeper assembly is located in the adaptor and is generally designated 22.

A tape connector keeper structure is also provided to locate the tape connector within the cartridge, while the cartridge 10 is outside the adaptor 12 as shown in FIG 2. This tape connector keeper structure is located within the cartridge 10 and is generally designated 24, and is depicted in FIG. 2.

In general, it is preferred that the cartridge follow an arcuate path as it is inserted into the adaptor. This may be achieved by providing a hinged door structure on the adaptor, which accepts and retains the cartridge in a door pocket. As the door is rotated into the closed position the cartridge follows a preferred arcuate path.

The preferred arcuate insertion path provides sequential activation of a number of cartridge and adaptor features. For example, it is preferred that the interconnectors intersect and mate prior to firmly seating the cartridge in the adaptor. It is also desired that cartridge be fully seated in the adaptor prior to the release of the cartridge lock assembly 20, shown in FIG. 1.

It is preferred that the cartridge, itself, automatically release the tether connector keeper 22 as the cartridge becomes fully seated in the adaptor. Reference may be had to either U.S. patent application Ser. No. 07/482,071 filed Feb. 20, 1990 or U.S. patent application Ser. No. 07/481,986 filed Feb. 20, 1990, each of which is incorporated by reference herein, for further information regarding door structures which provide the preferred arcuate insertion functions and structures.

Once the cartridge is fully seated, mechanical winding mechanism may used to transport the tether assembly between the home position and the ready-run position. As previously described, a manually operated winder is included in the adaptor to operate the clapper gear structures, generally designated 26. The clapper gear 29, in turn may be oriented to drive either the take up reel or the supply reel. For example, the clapper gear 29 may be engaged with the lower gear form flange 28 of the take up reel, as shown in FIGS. 4 and 5. Power delivered by the transfer gear 31 will advance the tether assembly to the "ready-run" position. In a similar fashion, the clapper gear assembly 26 may be moved into engagement with the lower gear form flange 30 of the supply reel 19, as shown in FIG. 3, and power supplied by the transfer gear 31 to drive the tether assembly toward the "home" position.

The remainder of the manually operated winder has not been depicted to clarify and simplify the drawings. Reference may be had to U.S. patent application Ser. No. 07/481,986 filed Feb. 20, 1990 which is incorporated by reference herein, for further information regarding winder structures which may be used to provide the power to operate the clapper gear structures.

At the conclusion of play, the cartridge tether assembly 16 is rewound, to return the tether to the "home" position depicted in FIG. 1 and FIG. 3.

Re-entry of the tape connector 25 into the cartridge 10 releases the cartridge lock 20. At this point the cartridge may be removed on the arcuate path defined by the adaptor. In general, rotational force supplied by the user to the cartridge, causes it to rotate out of the cartridge cavity 9, which in turn, causes the tether connector 23 to be recaptured by the tether connector keeper 22, and which, causes the tape connector 25 to be recaptured by the cartridge.

At this point, the user may remove the cartridge from the adaptor.

Detailed Description of the Tether Band

The tether band performs several functions. The tether band makes, supports and guides the interconnection across the tape path. The tether band has a length which is substantially equal to the circumference of the core or hub of the take up reel and as a consequence wraps completely around the hub forming a tape winding surface. This aspect permits relatively low tolerance over leader length and obviates the need for an indexed hub keyed to accept a tether like structure.

As described above, the tether assembly 16 mates with the tape connector 25 upon cartridge insertion, forming a non clasping, and zero insertion force, single axis interconnection. The tether band draws the tape 14 from the cartridge 10 across the tape path. The cantilever nature of the tether band, prevents the single axis interconnection from separating along the tape path. The tether band winds over the tether forming a winding surface for tape storage.

The term "tether assembly", refers to all the structures extending from the take-up reel hub to and including the tether connector 23. The term "tether band" refers to the self supporting band comprising the collection of hinged links 50,52 and 54. The term "tether" in isolation refers to the flexible film leader 21 between the tether band and the hub.

Figure 8:
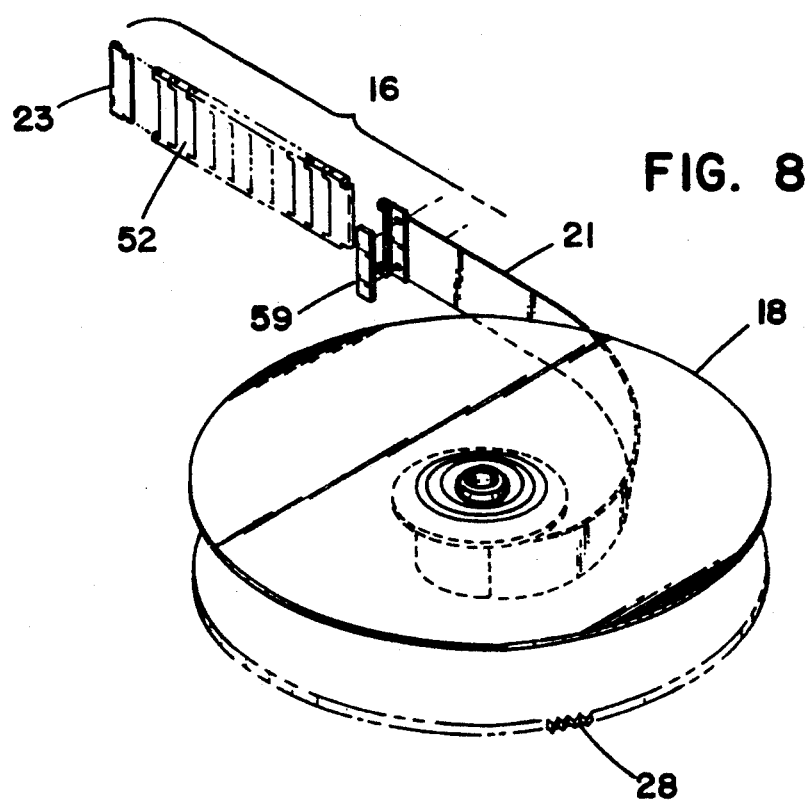
FIG. 8 is a perspective view of the take-up reel assembly.

FIG. 8 illustrates the attachment of the leader or tether 21 to the hub of the take-up reel 18. Typically, the leader 21 will be formed from a transparent plastic film in order to operate with certain optical sensors used in conventional videocassette.

As shown in the figure, the leader 21 is also coupled to a specialized tether attachment link 50. This specialized link 50 along with the path links 52, form the self supporting or cantilever tether band.

Figure 9:
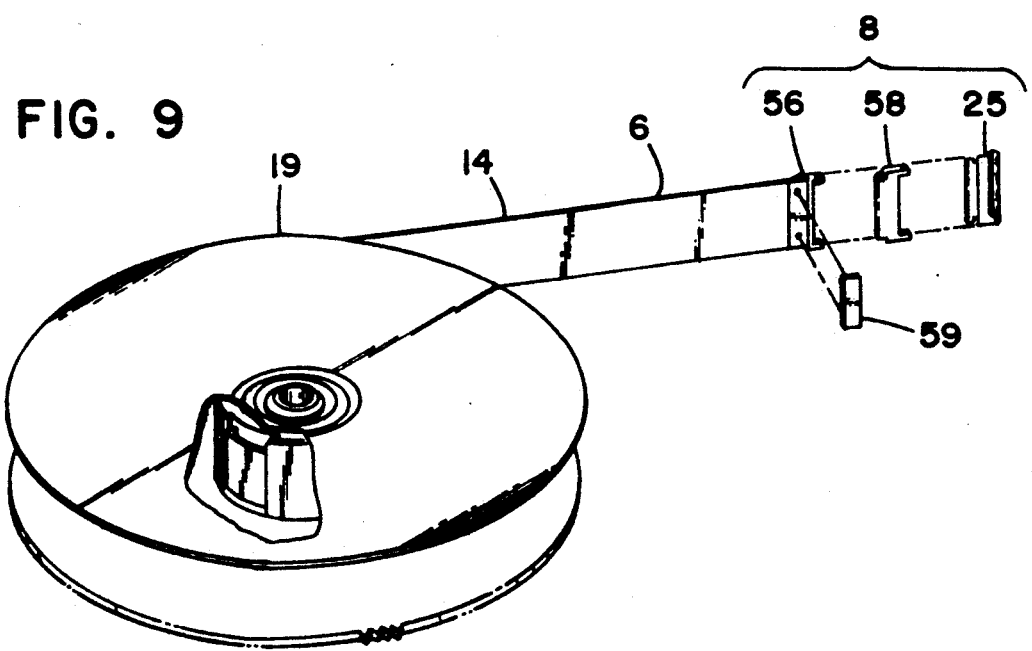
FIG. 9 is a perspective view of the supply reel assembly.

FIG. 9 shows the corresponding tape cartridge structures to mate the tape 14 with the tether band 16. One end of the tape 14 is anchored to the hub of the supply reel 19. The other end of the tape is terminated with a tape connector 25. Typically a transparent film leader 6 will be provided between the tape 14 and the connector assembly. The tape connector 25 is coupled to the tape through a tape connector link 58 and a tape attachment link 56.

The tape attachment link 56 and the tether attachment link 50 are terminated with identical attachment clip structures 59 for attaching the links to the tape 14 and the leader 21. The clip structures 59 are shown in FIG 8 and include stakes that are passed through the tape 14 and leader 21 to form a durable connection although other attachment means may be adopted.

Turning to FIG. 6 and 7, each path link 52 is hinged to its neighbor through the use of hinge pins 53. As an aid to automated assembly it is preferred to use two hinge pins per link as shown. In this configuration the band may freely flex or bend in the plane which contains the axis of the hinge pins. However the tolerance of the hinges are such that only minimal bending in the plane orthogonal to the hinge pins is permitted. The path links have a slightly convex upper surface 55, and a slightly concave lower surface 57. When the links are wound around the hub of the take-up reel 17 they form a segmented but substantially cylindrical surface to receive the tape 14. One advantage of this structure is that only the length of the free standing band need be controlled to a high precision to ensure the generation of an appropriate winding surface. The tether length is less critical and may have a higher tolerance than, would otherwise be permitted.

Figure 10:
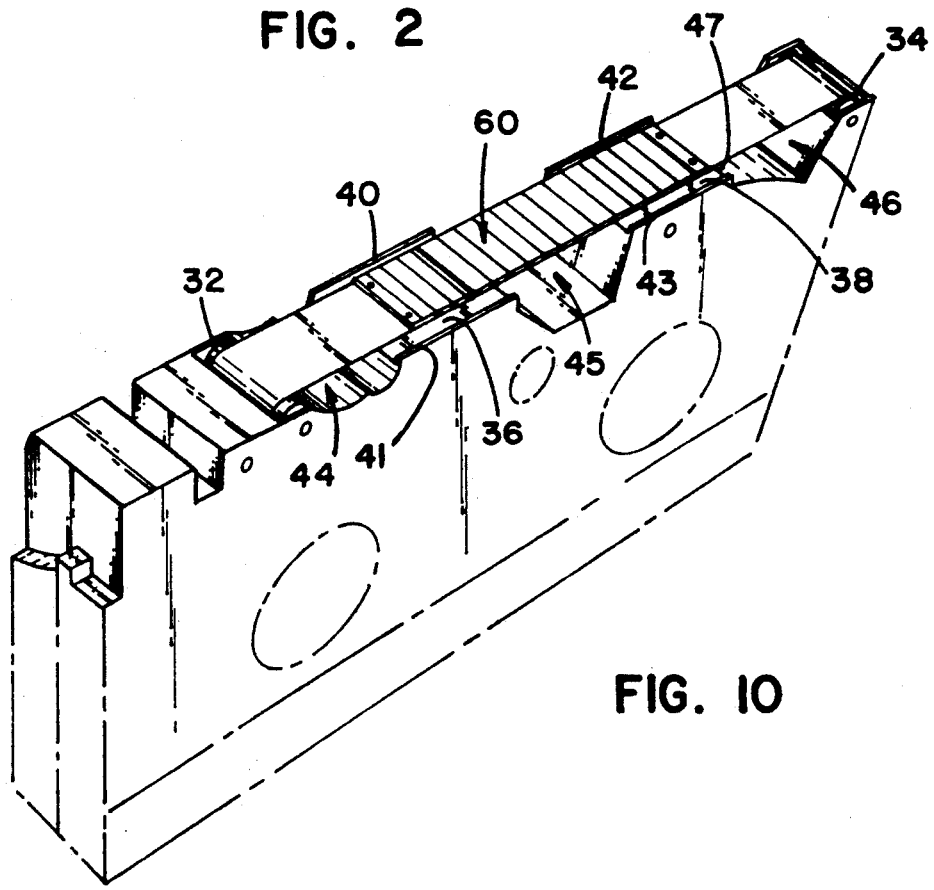
FIG. 10 is a perspective view of the tape channel formed in the adaptor housing.

This free standing band cooperates with the tape path channel 60. The tape channel is the passage formed between the rear surface of the tape access door 7 and the front of the housing shown in perspective view in FIG. 10, and in plan view in FIG. 5. This channel extends from the take up side post 32 to the supply side post 34. The tape path plane is defined by lands 36 and 38 and the periphery of the posts 32 and 34. The channel has several wall sections labeled 40-43 in FIG. 10. The channel 60 cooperates with the band 16 to guide the interconnection formed between connector 23 and connector 25 across unsupported sections of the tape path designated 44,45 and 46 in the FIG. 10.

When the tether band assembly is in the "home" position a large segment of the band extends from the tether connector keeper to the edge of the first land 36. It is desirable to have at least a portion of a link within the channel 60 so that the walls 42 and 43 locate and confine the edges of the band. However in general the minimum length of the band is determined by circumference of the take-up reel hub 17.

Detailed Description of the Interconnector Structures

Robust and reliable interconnection between the tape and the tether is required for product success. Prior art double axis connectors known from Novak rely on a positive clasp which elastically deforms to mate the tape with the tether. This elastic deformation is undesirable since inevitable wear will reduce the reliability of the connection. Another defect in the prior art system is the fact that tension on the interconnection structures is required to release the interconnectors from the their spring loaded jaws which also leads to undesirable wear.

In the present invention, the complimentary scroll form tubular structures of connector 23 and 25 mate with essentially zero force and form a single axis interconnector which is less prone to wear.

The tape connector 25 has a beveled surface 33, as does the tether interconnector 23 shown at 35. These features, form entry zones which interact and force the tubular members to align axially. This guiding function is capable of making a reliable connection as long as the circumferential tubular members intersect. This greatly reduces alignment requirements which is beneficial. In operation the first tubular tape connector can be moved or displaced along the axis to engage and mate with the second tubular tether connector. In this fashion the two tubular members overlap forming a substantially tubular interconnector which has only one axis, for rotation around guide posts 32 and the like. To prevent the interconnectors from falling through each other it is desirable to plug one connector as is shown by plug 37 in FIG. 6.

Although the tether band finds particular utility in adaptors of the type disclosed it should be understood that the self supporting tether can find utility in the tape transport mechanisms of a tape transport designed to directly accept the cartridge. The same is true for the zero insertion force single axis interconnector which is desirable for many cartridge applications.

What is claimed is:

1. A two-piece videocassette comprising:
a cartridge for insertion into a cartridge adaptor, said cartridge and said cartridge adaptor together forming said two-piece videocassette;
said cartridge having a rotatably mounted tape supply reel for storing a length of magnetic tape, said supply reel having a supply reel hub;
said length of magnetic tape having a first tape end and having a second tape end, said first tape end being attached ultimately to said supply reel, said second tape end being attached ultimately to a tape connector;
said cartridge adaptor having a cartridge receiving cavity adapted to receive said cartridge;
said cartridge adaptor having a tape path channel defining a tape path;
said cartridge adaptor having a take-up reel located within said cartridge adaptor and mounted for rotation within said cartridge adaptor, said take-up reel having a take-up reel hub;
said cartridge adaptor having a tether assembly, said tether assembly including a tether band, and a tether;
said tether having a first tether end and having a second tether end, said first tether end coupled to said tether band, and said second tether end connected to said take-up reel hub;
said tether band having a first tether band end and having a second tether band end, said first tether band end being coupled to a tether connector and said second tether band end being coupled to said tether;
said tether connector and said tape connector together adapted for mating engagement forming an interconnection;
whereby said tether band guides and supports said interconnection along said tape path channel;
said tether band being flexible in a first plane defined by the plane of said tape path channel and being inflexible in a plane orthogonal to said first plane and wherein said tether band comprises a plurality of articulated links hinged together forming a self supporting cantilever assembly.

2. The two-piece videocassette of claim 1 wherein said interconnection comprises:
a first tubular scroll-form tape connector having a first longitudinal axis, said first scroll-form connector being ultimately attached to said tape;
a second tubular scroll-form tape connector having a second longitudinal axis, said second tubular scroll-form connector being coupled to said tether band;
said first longitudinal axis being parallel to said second longitudinal axis;
said first and second tubular scroll-form connectors being adapted for mating engagement by displacement of said tubular scroll-form connectors along said first and second longitudinal axes respectively until said first and second tubular scroll-form connectors overlap, thereby forming an interconnection.

3. The two-piece videocassette of claim 2 wherein said first scroll-form connector contains a plug to contact said second scroll-form connector to prevent said first scroll-form connector from moving through said second scroll-form connector when said connectors are moved into mating engagement.

4. The two-piece videocassette of claim 2 wherein said first scroll-form connector has a beveled surface and said second scroll-form connector has a beveled surface said beveled surfaces together forming means for aligning said first and second connectors for mating engagement.

5. The two-piece videocassette of claim 1 wherein said tether hand has a length substantially equal to the circumference of said take-up reel hub.

* * * * *

UNITED STATES PATENT AND TRADEMARK OFFICE
CERTIFICATE OF CORRECTION

PATENT NO. : 5,207,395  
DATED : May 4, 1993  
INVENTOR(S) : Jerrold K. Weeks

It is certified that error appears in the above-indentified patent and that said Letters Patent is hereby corrected as shown below:

On the Title page, in the Abstract, in the last line of the ABSTRACT, delete the word "complimentary", and substitute therefor --complementary--.

In column 4, lines 52 and 53, please delete the words "patent application" and substitute therefor --Patent Application--

In column 5, line 9, please delete the words "patent application" and substitute therefor --Patent Application--

In column 6, line 65, please delete the word "complimentary" and substitute therefor --complementary--

In column 8, line 24, in claim 2, please delete the word "tape" and substitute therefor --tether--

UNITED STATES PATENT AND TRADEMARK OFFICE
CERTIFICATE OF CORRECTION

PATENT NO. : 5,207,395

DATED : May 4, 1993

INVENTOR(S) : Jerrold K. Weeks

It is certified that error appears in the above-indentified patent and that said Letters Patent is hereby corrected as shown below:

In column 8, line 26, in claim 2, after the word "connector", please delete the word "being".

Signed and Sealed this

Fourth Day of January, 1994

*Attest:*

BRUCE LEHMAN

*Attesting Officer*     *Commissioner of Patents and Trademarks*